United States Patent [19]

Gardner et al.

[11] Patent Number: 5,621,482

[45] Date of Patent: Apr. 15, 1997

[54] INTERFACE SYSTEM FOR A TELEVISION RECEIVER

[75] Inventors: Timothy J. Gardner; Spyros Bournias; Larry Johnson, all of Knoxville, Tenn.

[73] Assignee: U.S. Philips Corporation, New York, N.Y.

[21] Appl. No.: 556,692

[22] Filed: Nov. 13, 1995

Related U.S. Application Data

[63] Continuation-in-part of Ser. No. 362,037, Dec. 22, 1994.

[51] Int. Cl.$^6$ .................................................. H04N 5/44
[52] U.S. Cl. ..................... 348/725; 348/552; 348/553; 348/719
[58] Field of Search ..................... 348/552, 553, 348/565, 571, 718, 719, 725, 836, 843; 379/142; H04N 5/22

[56] References Cited

U.S. PATENT DOCUMENTS

| | | | |
|---|---|---|---|
| 4,337,480 | 6/1982 | Bourassin et al. | 358/93 |
| 5,274,455 | 12/1993 | Nishide et al. | 358/188 |
| 5,359,367 | 10/1994 | Stockill | 348/552 |
| 5,404,393 | 4/1995 | Remillard | 379/96 |
| 5,467,385 | 11/1995 | Reuben et al. | 379/142 |

*Primary Examiner*—Glenton B. Burgess
*Attorney, Agent, or Firm*—Edward W. Goodman

[57] ABSTRACT

An interface system for a television receiver includes an interface connector having a plurality contacts connected to various component circuits in the television receiver. In order to provide various functions for the television receiver, the interface system includes various circuit boards each having a plug connectable with the interface connector. The plug includes a number of contacts equal to or less than the plurality of contacts in the interface connector. Depending on the desired function, the circuit board further includes circuits for providing the function, these circuits being interconnected and connected to the appropriate contacts in the plug for connecting with the appropriate component circuits in the television receiver. The interface system allows the television receiver functions to be modified and/or updated without the need for opening the television and modifying the circuits and/or the wiring to the circuits.

5 Claims, 5 Drawing Sheets

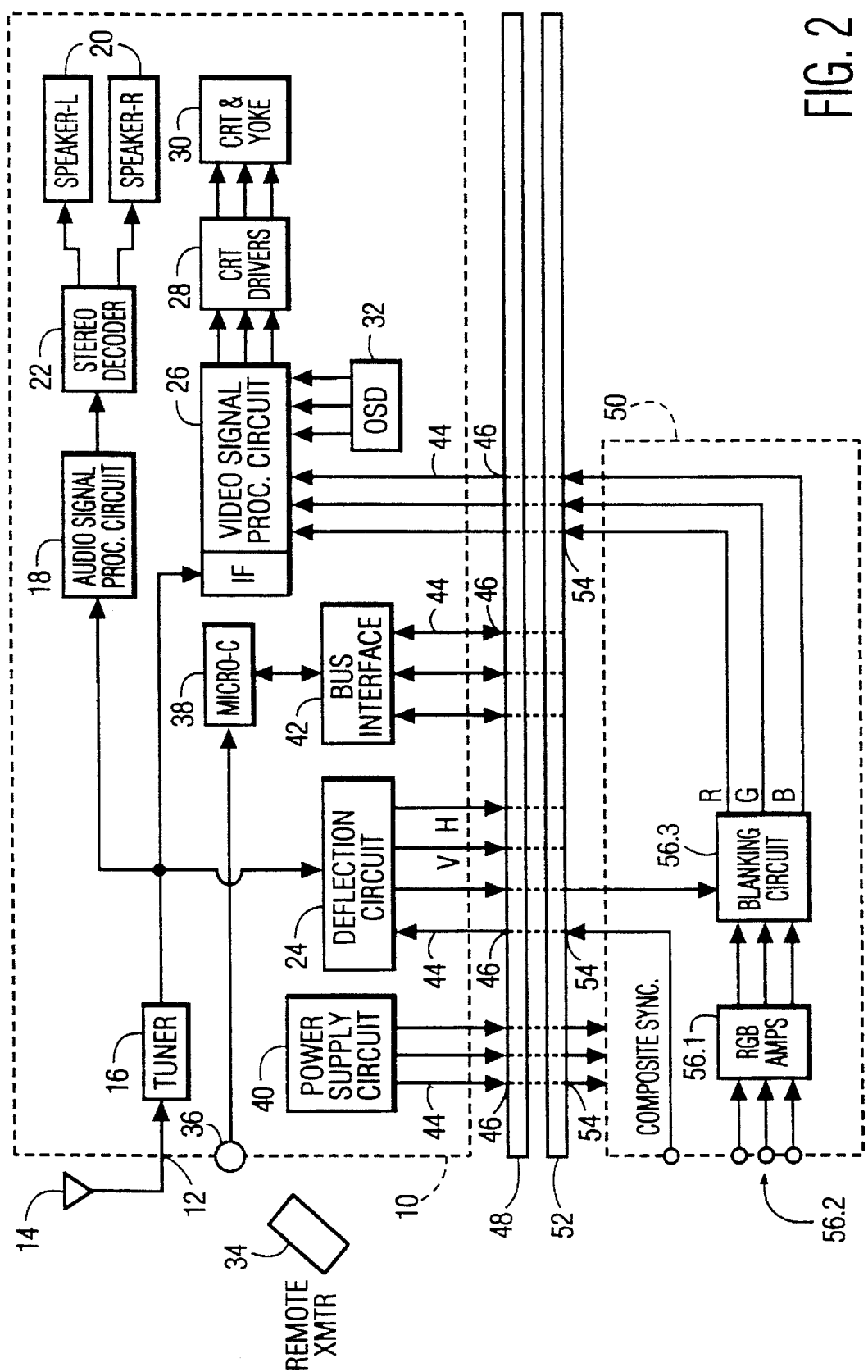

INTERFACE SYSTEM FOR A TELEVISION RECEIVER

CROSS-REFERENCE TO RELATED APPLICATIONS

This is a continuation-in-part application to U.S. patent application Ser. No. 08/362,037, filed Dec. 22, 1994, pending.

BACKGROUND OF THE INVENTION

1. Field of The Invention

The subject invention relates to television receivers and the various functionality options now available to a user.

2. Description of The Related Art

Television receivers that are being marketed today have various optional functions which may be incorporated therein. For example, the television receiver may include Picture-in-Picture (PIP) in which the video signal for PIP is provided by a second signal source (a VCR) connected to a second video input of the television receiver, or a second tuner so that the television receiver may by itself provide PIP. These and other optional features are provided by modifying the circuitry inside the television receiver. Quite naturally, these changes must be implemented in the production line resulting in a plurality of different models of the television receiver being fabricated. It should be apparent that this results in relatively high production costs. In marketing these separate models of television receivers, a dealer must then anticipate what features his/her customers would desire, and order sufficient quantities of the specific models. Any others must be ordered specifically for that consumer which may result in a lost sale.

In another situation, unless the particular model of television receiver in the user's possession has the appropriate features, the user must open up the television receiver, and cut into existing wiring so that the user may be able to adapt the television receiver for use with, for example, a computer.

SUMMARY OF THE INVENTION

It is an object of the present invention to devise a standard television receiver which is easily adaptable for different functionalities.

It is a further object of the present invention to provide a standard television receiver in which the different functionalities may be adapted without opening the television receiver and physically modifying the circuitry therein.

The above objects are achieved in an interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, and a display coupled to said deflection circuit and said video signal processing circuit for displaying said video signal in dependence on said deflection signals, characterized in that said interface system comprises:

standard bus means having M leads separately connected to said audio signal processing circuit, said deflection circuit and said video signal processing circuit, where M is an integer greater than one;

connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit and the deflection circuit in the television receiver, modifies the operation of said television receiver thereby providing additional features for the user.

As shown in FIG. 1, the interface system of the subject invention allows a television receiver to be modified and/or upgraded to various different functionalities including, for example: CD-Video, CD-I, television/computer interface, ghost cancellation, dual tuner PIP, digital compressed video cable interface, hotel/motel/hospital pay-per-view system, etc., just by plugging the appropriate circuit board into the interface connector.

BRIEF DESCRIPTION OF THE DRAWINGS

With the above and additional objects and advantages in mind as will hereinafter appear, the invention will be described with reference to the accompanying drawings, in which:

FIG. 2 shows, in block diagram form, a standard television receiver, in which the interface system is used to provide an RGB input to the television receiver;

DESCRIPTION OF THE PREFERRED EMBODIMENTS

Figure 1:
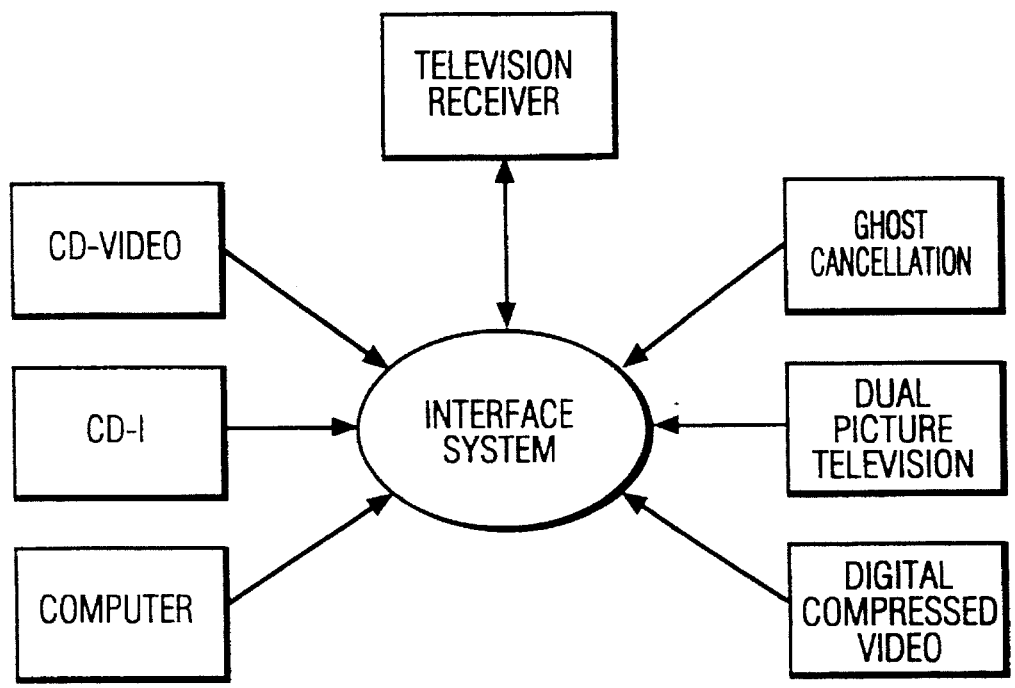
FIG. 1 shows the various different applications for the interface system of the subject invention.

FIG. 2 shows a standard television receiver 10 having an input 12 for receiving television signals from, for example, an antenna 14. The input 12 is connected to a tuner 16 for tuning the television receiver 10 to a particular television signal. The output from the tuner 16 is connected to an audio signal processing circuit 18 which separates an audio signal from the received television signal. An output from the audio signal processing circuit 18 is connected to a stereo decoder 22 which decodes the audio signal into separate left and right audio signals which are applied to a left and a right speaker 20 for receiving the amplified left and right audio signals. The output from the tuner 16 is also applied to a deflection circuit 24 for generating deflection signals from the synchronization signals contained in the television signal, and to a video signal processing circuit 26 for processing the video signal contained in the television signal into component signals for application to cathode ray tube (crt) driver circuits 28 for driving a crt 30, which receives the deflection signals from the deflection circuit 24. The video signal processing circuit 26 has an on-screen display circuit 32 connected thereto for providing video signals indicating messages for display of the crt 30. As noted in FIG. 2, an infrared remote control transmitter 34 is shown for interaction with a remote control receiver 36 in the television receiver 10. A microcomputer 38 is also shown which controls the operation of the other elements in the television receiver 10. Finally, a power supply circuit 40 is shown which provides operating power to each of the above circuits. It should be noted that the connecting lines between these components have been omitted for clarity, any one skilled in the art would know how each of these circuits would be interconnected.

The subject invention includes the provision of a bus interface 42 in the television receiver 10 which is connected to the microcomputer 38, and a standard bus having lines 44 connected to each of the above-noted components. These lines 44 are then connected to contacts 46 in an interface connector 48. A circuit board 50 is then provided with a plug 52 having contacts 54 for engaging with the contacts 46 in the interface connector 48. In particular, depending on the functionalities to be offered by the particular circuit board 50, various of the contacts 54 in the plug 52 are connected to circuits 56 mounted on the circuit board 50. In particular, as shown in FIG. 2, these circuits 56 include Red, Green, Blue (RGB) amplifiers 56.1 having inputs for receiving RGB signals from connector jacks 56.2 on the circuit board 50, and a blanking circuit 56.3 having inputs connected to outputs from the RGB amplifiers 56.1 and to a sand-castle signal from the deflection circuit 24, via the connector 48 and plug 52. The RGB outputs from the blanking circuit 56.3 are connected to the video signal processing circuit 26 via the plug 52 and the connector 48. Power is applied to the circuit components on the circuit board 50 from the power supply circuit 40 via the connector 48 and plug 52. Under control of the microcomputer 38, the user may selectively choose video signals received at the input 12 from the antenna 14, or the RGB signals applied to the circuit board 50 for display on the crt 30.

Figure 3:
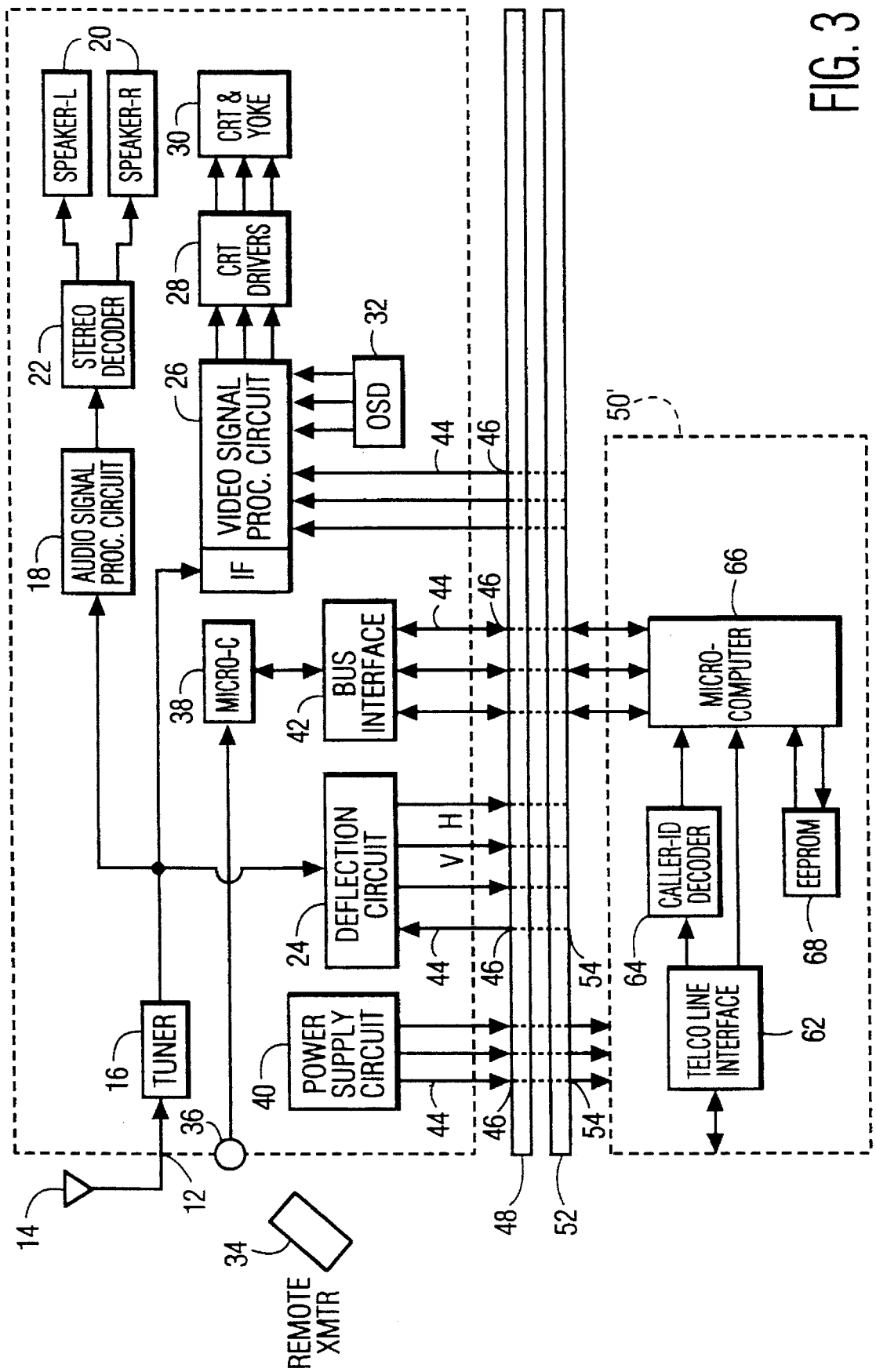
FIG. 3 shows, in block diagram form, the standard television receiver, in which the interface system is used to provide a Caller-ID function.

FIG. 3 shows an embodiment in which the interface system provides Caller-ID. In particular, the circuit board 50' includes a telephone company (TELCO) line interface circuit 62 which is connected to the user's telephone line. A Caller-ID decoder 64, which may be Motorola IC MC145447 is connected to an output of the TELCO line interface circuit 62 for receiving an ID data signal included in a telephone signal between the first and second rings. The decoded ID data at the output of the Caller-ID decoder 64 is applied to an input of a microcomputer 66, which also receives a call indication signal from the TELCO line interface circuit 62. The microcomputer 66 stores the decoded ID data in an EEPROM 68 and selectively applies the decoded ID data to the bus interface 42 through the contacts 54 in the plug 52, connected to the contacts 46 in the connector 48. The Caller-ID function, and in particular, the Caller-ID decoder 64 operate in accordance with that disclosed in U.S. Pat. No. 4,582,956 to Doughty. The television microcomputer 38 controls the application of the Caller-ID data to the video signal processing circuit 26, and the display of the same on the crt 30.

Figure 4:
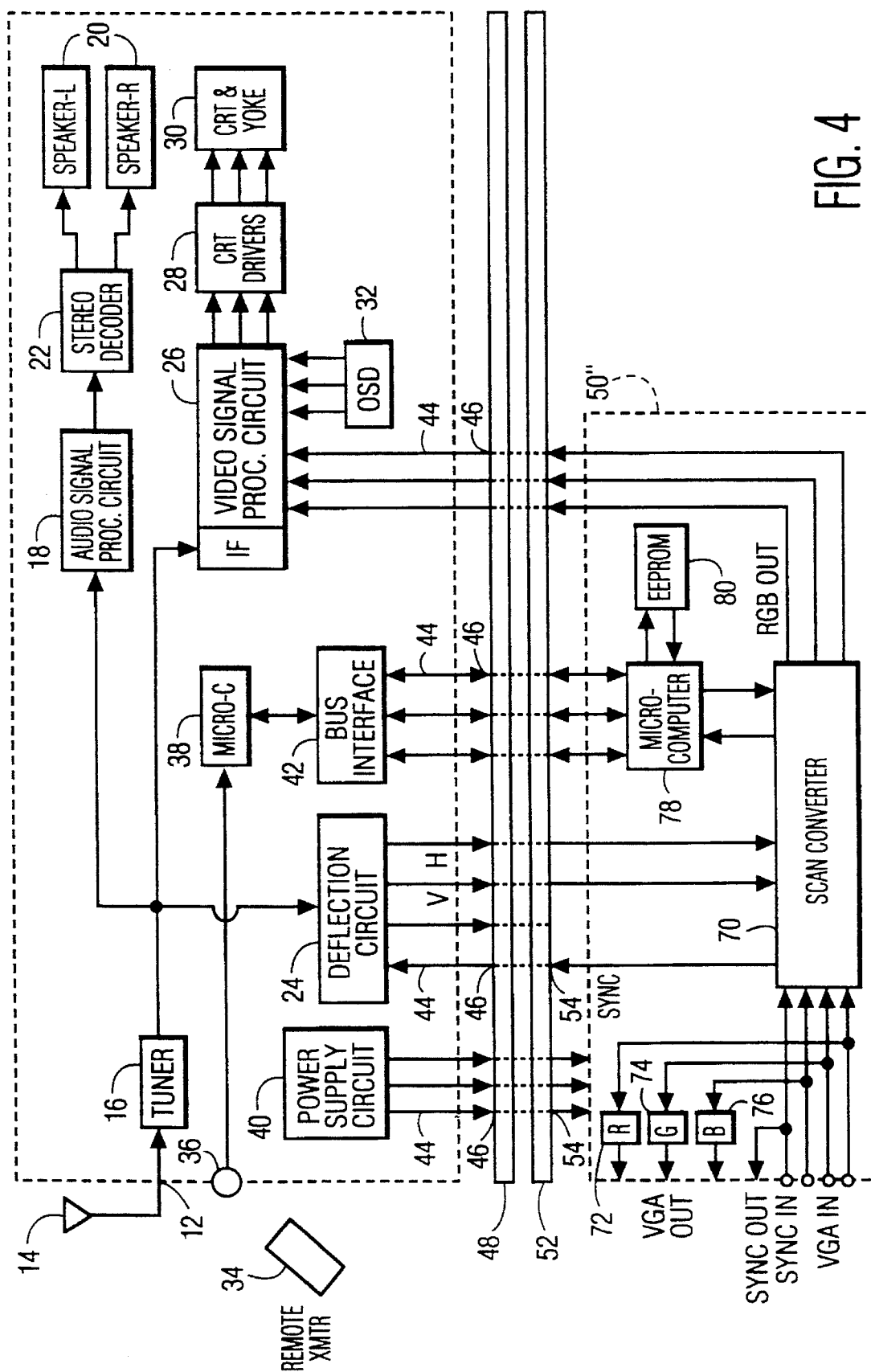
FIG. 4 shows, in block diagram form, the standard television receiver, in which the interface system is used to provide a VGA scan conversion function.

FIG. 4 shows an embodiment in which the interface system provides scan conversion so that the television receiver 10 may be used as a computer monitor. In particular, ordinarily, the television receiver 10 is set up so that the video signal is overscanned, i.e., the picture being formed is larger than the display area of the crt 30. This is done to avoid black bands from appearing at the edges of the picture. However, if this is done with a computer video signal, valuable data may be missing from the display. To this end, the interface system is used to convert the scanning of the television receiver from overscanning to underscanning. The circuit board 50" includes a scan converter 70 which receives the RGB signals, along with a sync. signal, from a computer (not shown). These signals are also routed to RGB outputs through separate R, G and B amplifiers 72, 74 and 76. The scan. converter 70 receives horizontal and vertical synchronizing signals from the deflection circuit 24 and, in turn, applies a synchronization signal to the deflection circuit 24. RGB outputs from the scan converter are applied to the video signal processing circuit 26. The scan converter 70 is controlled by a microcomputer 78, having an EEPROM 80 connected thereto. When the user decides to use the television receiver 10 as a computer monitor, the television microcomputer 38 activates the microcomputer 78 on the circuit board 50" and causes the video signal processing circuit 26 to select the RGB outputs from the scan converter 70.

Figure 5:
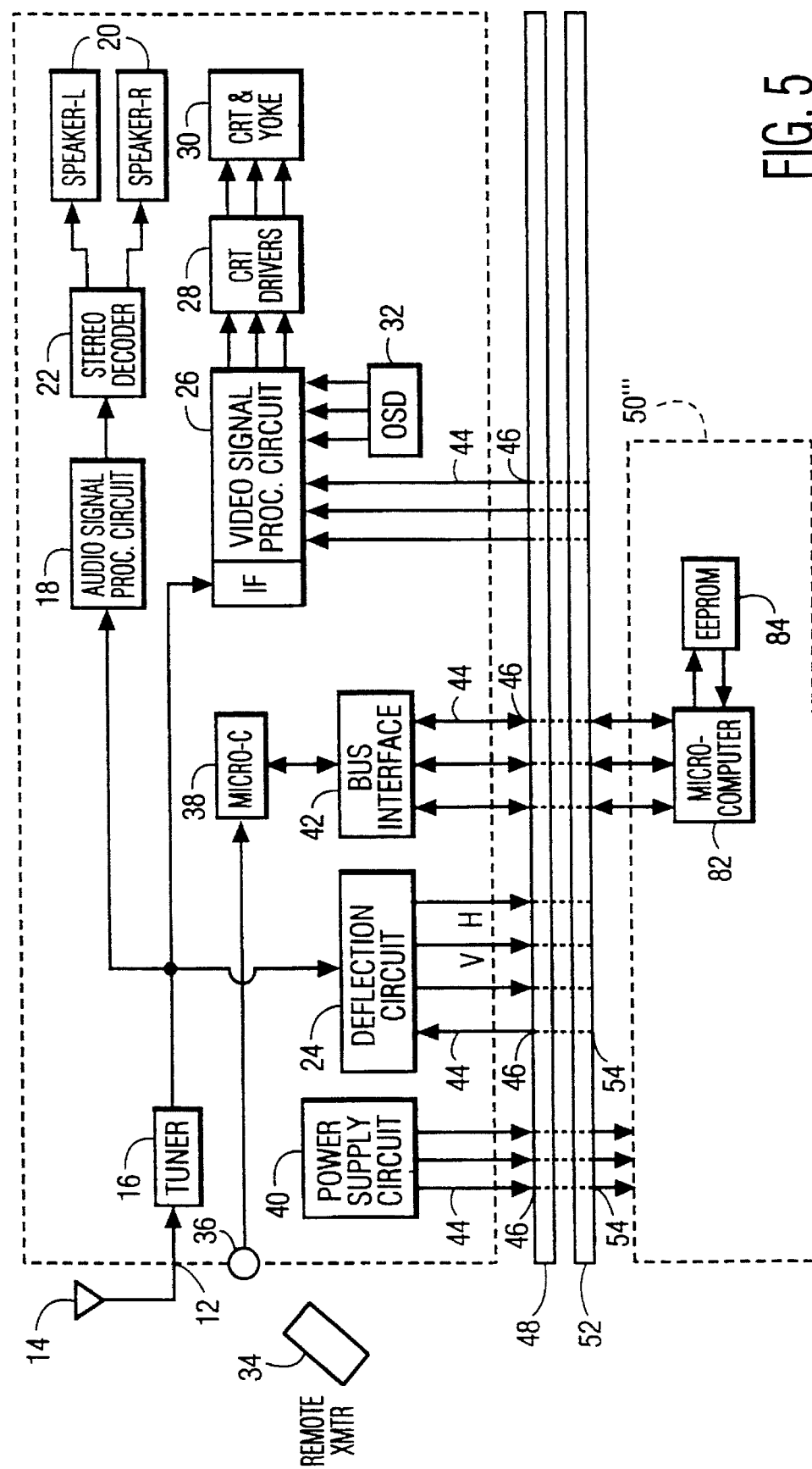
FIG. 5 shows, in block diagram form, the standard television receiver, in which the interface system is used to provide a demonstration display of the uses of the subject invention.

In order to aid in the sale of the interface system of the subject invention, the interface system may also include, as shown in FIG. 5, a demonstration mode in which the circuit board 50''' is arranged to provide selected video sequences for display on the crt 30. In particular, the circuit board 50''' includes a microcomputer 82 having an EEPROM 84 connected thereto. The EEPROM 84 has stored therein various video sequences which are selectively addressed by the microcomputer 82. The microcomputer 82, coupled to the television microcomputer 38 through the contacts 54 in the plug 52 connecting with the contacts 46 in the connector 48, and the bus interface 42, then applies the selected video sequence to the television microcomputer 38 for application to the video signal processing circuit 26 for subsequent display on the crt 30.

Figure 6:
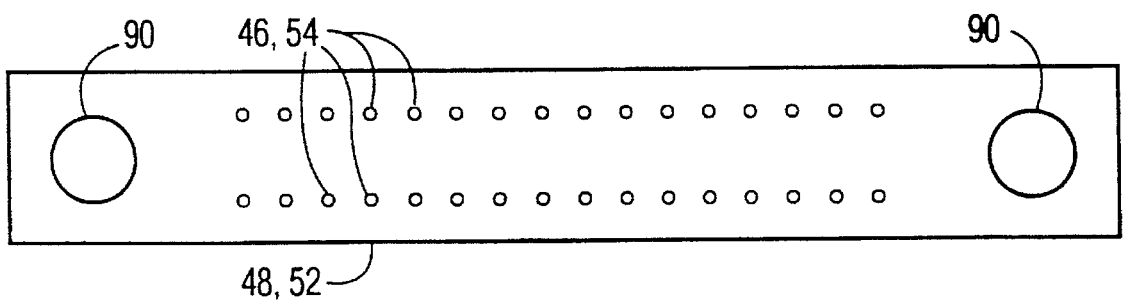
FIG. 6 shows an interface connector for use in the interface system.

FIG. 6 shows and example of an interface connector/plug 48/52. In particular, the interface connector 48 and mating plug 52 are 32-pin mating connectors in which the pins are arranged in two rows. The connectors/plugs include through-holes 90 into which fastening means (not shown) are used to secure the plug 52 to the connector 48. In a preferred embodiment of the invention, the contacts 46 on the connector 48 are connected to the various circuits in the television receiver as shown in Table 1:

TABLE 1

| | |
|---|---|
| PIN 1 | −13 VDC |
| PIN 2 | GROUND |
| PIN 3 | +13 VDC |
| PIN 4 | CHASSIS GND(EX-μC) |
| PIN 5 | IR DATA IN |
| PIN 6 | IR DATA OUT |
| PIN 7 | INTERFACE CLOCK |
| PIN 8 | INTERFACE DATA IN |
| PIN 9 | INTERFACE DATA OUT |
| PIN 10 | BEAM LIMITER OUT |
| PIN 11 | HOR. BLANK OUT |
| PIN 12 | VERT. BLANK OUT |
| PIN 13 | CHASSIS VIDEO GND |
| PIN 14 | CVBS IN |
| PIN 15 | N/A |
| PIN 16 | RED TTL IN |
| PIN 17 | BLUE ANALOG IN |

TABLE 1-continued

| PIN 18 | GREEN ANALOG IN |
| PIN 19 | RED ANALOG IN |
| PIN 20 | SAND CASTLE OUT |
| PIN 21 | N/A |
| PIN 22 | N/A |
| PIN 23 | AUDIO OUT - LOW |
| PIN 24 | N/A |
| PIN 25 | N/A |
| PIN 26 | N/A |
| PIN 27 | AUDIO OUT |
| PIN 28 | N/A |
| PIN 29 | AUDIO IN - LOW |
| PIN 30 | FAST BLANKING IN |
| PIN 31 | GREEN TTL IN |
| PIN 32 | RED TTL IN |

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. An interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above circuits, wherein said interface system comprises:

standard bus means having M leads separately connected to said audio signal processing circuit, said deflection circuit, said video signal processing circuit and said power supply circuit, where M is an integer greater than one;

connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a remote control receiver for receiving remote control signals from a remote control transmitter, and a microcomputer for controlling said television receiver at least partly in response to signals from said remote control receiver, and said standard bus includes leads connected to said microcomputer, said microcomputer being connected to said circuit board by said connector means and said plug means so that said circuit means on said circuit board means are controlled by said microcomputer, wherein said interface system provides separate red, green and blue inputs for said television receiver, characterized in that the circuit means on said circuit board means includes red, green and blue signal amplifiers for amplifying red, green and blue signals applied to inputs on said circuit board means; and a blanking circuit having inputs connected, respectively, to outputs said red, green and blue amplifiers, said blanking circuit having red, green and blue outputs coupled to three contacts of said N contacts of said plug means, for connecting to corresponding three contacts of said M contacts of said interface connector means, said corresponding three contacts of said M contacts of said interface connector means being connected to said video signal processing circuit.

2. An interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above circuits, wherein said interface system comprises:

standard bus means having M leads separately connected to said audio signal processing circuit, said deflection circuit, said video signal processing circuit and said power supply circuit, where M is an integer greater than one;

connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a remote control receiver for receiving remote control signals from a remote control transmitter, and a microcomputer for controlling said television receiver at least partly in response to signals from said remote control receiver, and said standard bus includes leads connected to said microcomputer, said microcomputer being connected to said circuit board by said connector means and said plug means so that said circuit means on said circuit board means are controlled by said microcomputer, wherein said interface system provides a Caller-ID function for said television receiver, characterized in that said circuit means on said circuit board means include a telephone line interface circuit for connection to a telephone line; a Caller-ID decoder for decoding Caller-ID data included in a telephone signal on said telephone line; a microcomputer coupled to an output of said Caller-ID decoder and to an output of said telephone line interface circuit for receiving decoded Caller-ID data from said Caller-ID decoder when said telephone line interface circuit indicates the receipt of said Caller-ID data; and a memory coupled to said microcomputer for storing said decoded Caller-ID data, said microcomputer having outputs connected to contacts of said N contacts in said plug means which are, in turn, connected to respective contacts of said M contacts in said interface connector means, said respective contacts being connected to said microcomputer in said television receiver, whereby said microcomputer on said circuit board means applies the decoded Caller-ID data to said microcomputer in said television receiver which, in turn, selectively applies the Caller-ID data to the video signal processing circuit for application to the display.

3. An interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above circuits, wherein said interface system comprises:

standard bus means having M leads separately connected to said audio signal processing circuit, said deflection circuit, said video signal processing circuit and said power supply circuit, where M is an integer greater than one;

connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a remote control receiver for recieving remote control signals from a remote control transmitter, and a microcomputer for controlling said television receiver at least partly in response to signals from said remote control receiver, and said standard bus includes leads connected to said microcomputer, said microcomputer being connected to said circuit board by said connector means and said plug means so that said circuit means on said circuit board means are controlled by said microcomputer, wherein said interface system provides scan conversion for said television receiver, characterized in that said circuit means on said circuit board means includes a scan converter having RGB inputs for receiving separate red, green and blue (RGB) signals, a synchronizing signal input for receiving a synchronizing signal associated with said RGB signals, horizontal and vertical synchronizing signal inputs for receiving horizontal and vertical synchronizing signals from said deflection circuit in said television receiver via said interface connector means and said plug means, and RGB outputs coupled to inputs of said video signal processing circuit via said interface connector means and said plug means; and a microcomputer coupled to said scan converter for controlling operations of said scan converter, said microcomputer being coupled to the microcomputer in said television receiver via said interface connector means and said plug means, whereby said scan converter causes said television receiver to underscan the signals applied to the display.

4. An interface system as claimed in claim 3, characterized in that said circuit means on said circuit board means further includes separate red, green and blue amplifiers also coupled to receive said RGB signals, said red, green and blue amplifiers having outputs connected to outputs of said circuit board means.

5. An interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above circuits, wherein said interface system comprises:

standard bus means having M leads separately connected to said audio signal processing circuit, said deflection circuit, said video signal processing circuit and said power supply circuit, where M is an integer greater than one;

connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said television receiver thereby providing additional features for the user, wherein said television receiver further comprises a remote control receiver for receiving remote control signals from a remote control transmitter, and a microcomputer for controlling said television receiver at least partly in response to signals from said remote control receiver, and said standard bus includes leads connected to said microcomputer, said microcomputer being connected to said circuit board by said connector means and said plug means so that said circuit means on said circuit board means are controlled by said microcomputer, characterized in that said circuit means on said circuit board means includes a further microcomputer, and a memory having a plurality of video sequences stored therein coupled to said further microcomputer, said further microcomputer being coupled to said microcomputer in said television receiver, whereby said further microcomputer on said circuit board means selectively accesses one of said video sequences stored in said memory and applies said selected video sequence to said microcomputer in said television receiver for application to said video signal processing circuit for display on said display.

* * * * *